March 5, 1957  W. P. FRANKENSTEIN  2,783,932
CAKE LIFT

Filed July 23, 1953  3 Sheets-Sheet 1

INVENTOR.
WILLIAM P. FRANKENSTEIN
BY
Joseph A. Rave
Attorney

March 5, 1957     W. P. FRANKENSTEIN     2,783,932

CAKE LIFT

Filed July 23, 1953     3 Sheets-Sheet 2

INVENTOR.
WILLIAM P. FRANKENSTEIN
BY
*Joseph A. Rave*
Attorney

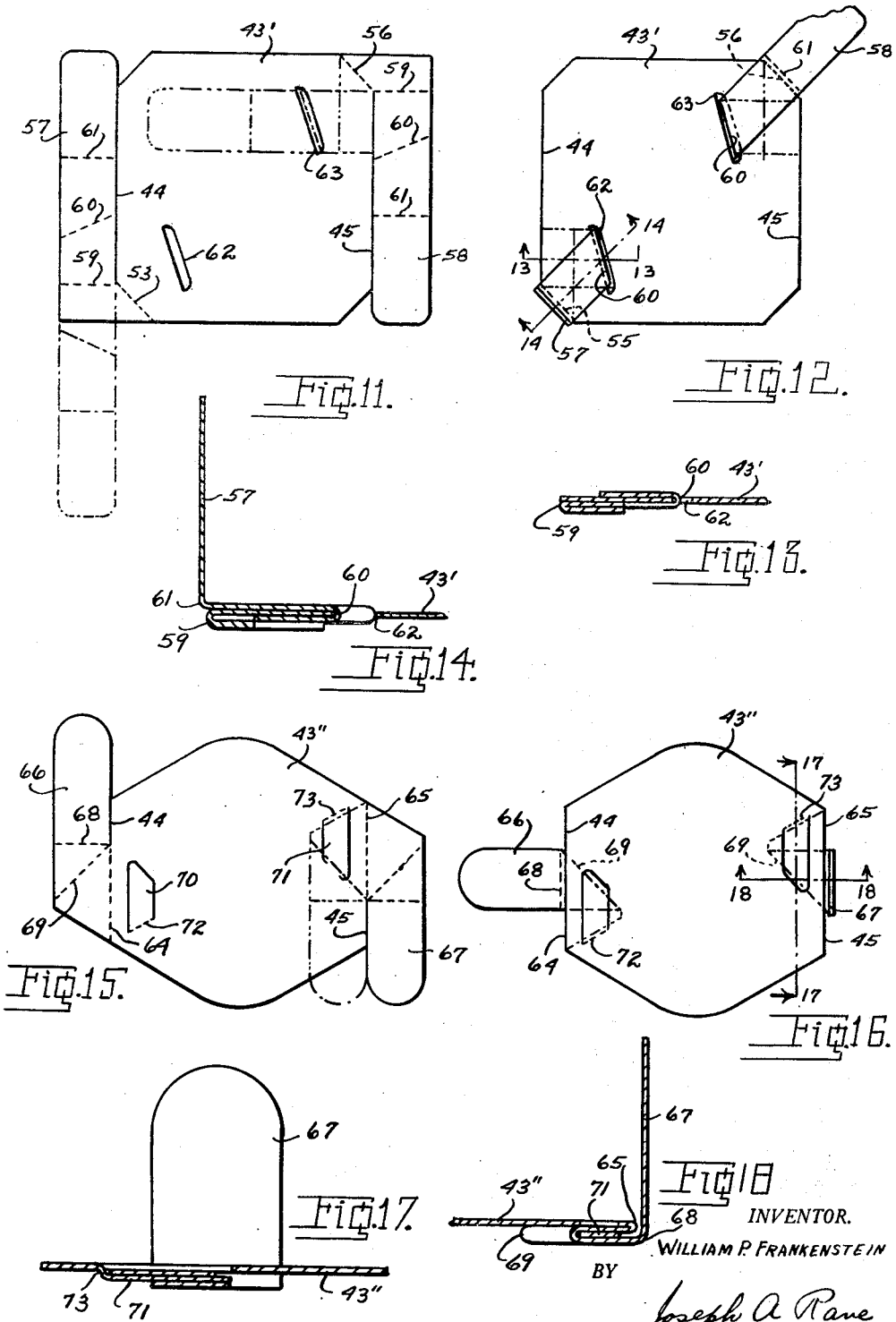

United States Patent Office 2,783,932
Patented Mar. 5, 1957

2,783,932

CAKE LIFT

William P. Frankenstein, Cincinnati, Ohio

Application July 23, 1953, Serial No. 369,885

9 Claims. (Cl. 229—30)

This invention relates to improvements in a cake package and particularly to an improved cake lift for use in said package.

The device of the present invention is for use with frosted or decorated cakes as produced in commercial bakeries, particularly, for inserting said frosted or decorated cakes into and removing same from a four-sided box or carton. In use the cake lift, as well as the cake itself, is below the upper end of the box or carton so that the said carton may be machine-wrapped in transparent material without damaging the cake decoration.

The improved cake lift of the present invention discloses an improvement on the cake lift disclosed in applicant's pending application Serial No. 271,491, filed February 14, 1952.

The principal object of the present invention is the provision of a cake lift having lifting arms at the corners of the usual liner on which the cakes are mounted prior to frosting and for sale purposes, and wherein the connection of the said lift arms with the liner is reinforced to insure proper operation of the device.

Another object of this invention is the provision of a cake lift for accomplishing the foregoing object that may be produced from a single blank.

A further and specific object of the present invention is the provision of a cake lift for accomplishing the foregoing objects that is formed from a minimum amount of material, such as paper or cardboard, and can therefore be economically acquired.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

Figure 7:
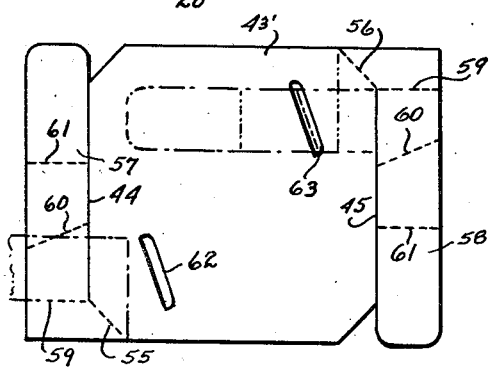
Fig. 7 is an extended plan view of a blank of a modified form of the cake lift embodying the principles of the present invention, also illustrating two steps in the setting up of this blank to its final form.
Figure 9:
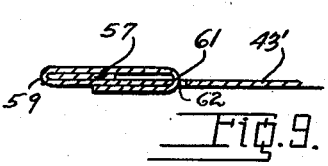
Fig. 9 is an enlarged fragmentary sectional view of the erected modified cake lift as seen from line 9—9 on Fig. 8.

Figs. 11, 12, 13 and 14 are views similar to Figs. 7, 8, 9 and 10 of the modified cake lift illustrating a second method of erecting the blank of Fig. 7 with said Figs. 13 and 14 being taken respectively on lines 13—13 and 14—14 on Fig. 12.

Fig. 15 is a plan view of a further modification of the cake lift and also illustrating the first step in the erection thereof.

Fig. 16 is a plan view of the blank of Fig. 15 illustrating two further steps in the erection of the cake lift.

Fig. 17 is an enlarged fragmentary sectional view through a fully erected cake lift of Fig. 15 as seen from line 17—17 on Fig. 16.

Fig. 18 is an enlarged fragmentary sectional view through the fully erected cake lift from the blank of Fig. 15 taken at right angles to Fig. 17 on line 18—18 on Fig. 16.

Throughout the several views of the drawings similar reference characters are employed to denote the same or similar parts.

As noted above, the cake lift of the present invention is adapted for use with a four-sided or four-walled box or carton and there is illustrated in the drawings one such box or carton. This box or carton may be formed from a single blank which provides substantially centrally thereof the carton bottom indicated by the reference numeral 20 and bounded by score or fold lines 21, 22, 23 and 24. The score or fold lines 21 and 23, respectively, integrally, hingedly, connect with the carton bottom substantially identical extensions 25 which in the erected carton form what may be termed the end walls thereof, while the score or fold lines 22 and 24 similarly, respectively, integrally, hingedly, connect with the bottom 20 substantially identical extensions 26 which in the erected carton form what may be termed the side walls.

The end wall extensions 25 are each provided intermediate its outer end an attaching score or fold line with score or fold line 27 thereby providing an end wall outer wall member 28 and an end wall inner wall member 29 which are foldable relative to one another on the score or fold line 27. Each end wall outer wall member 28 has its ends defined by score or fold lines 30 and 31, while each inner wall member 28 is provided at its outer corners with a locking lug 32 and 33.

The side wall extensions 26 are each, similarly, provided with a score or fold line 34 intermediate its outer end and attaching score or fold line for providing side wall outer wall member 35 and side wall inner wall member 36, respectively, foldable on the score or fold line 34. Each side wall outer wall member has its ends defined by a score or fold line 37 and 38, while each side wall inner wall member is provided in its outermost corners with a notch 39 and 40.

The adjacent ends of the side walls outer wall members and the end walls outer wall members are joined to one another through a corner flap 41 through the respective score or fold lines defining the said ends of said outer wall members. The corner flaps 41 are each provided with a diagonal score or fold line 42 whereby said corner flaps may be folded upon themselves bellows-wise and are, accordingly, generally designated as bellows corners.

Figure 1:
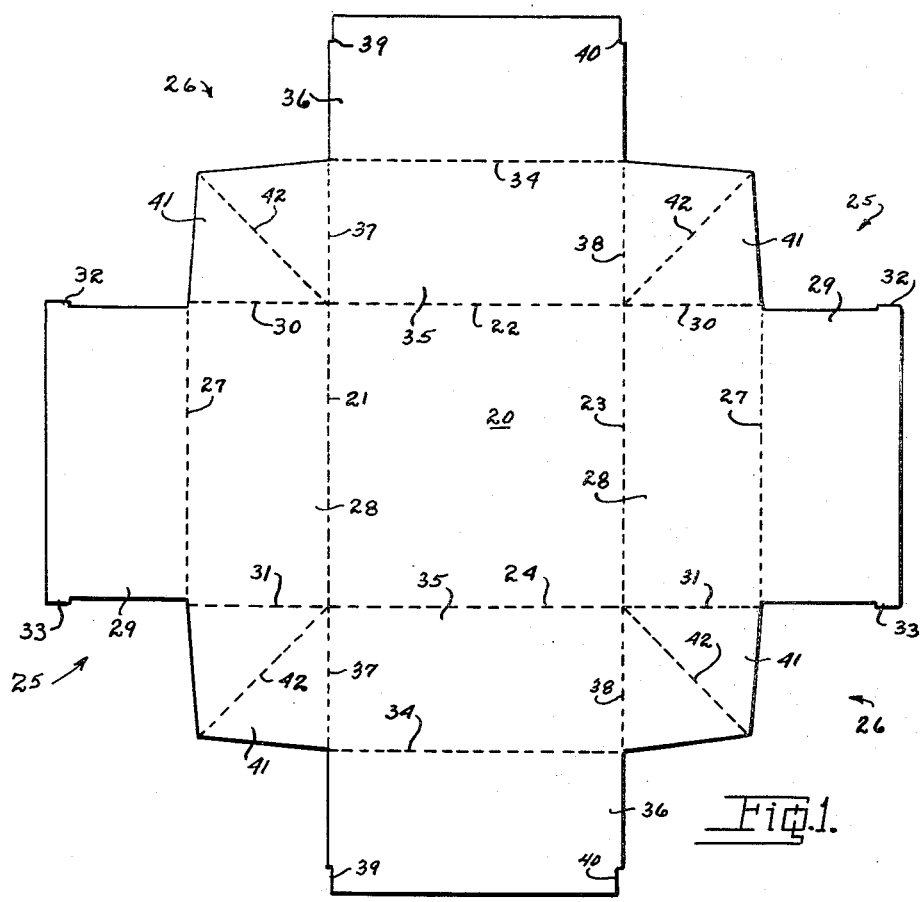
Fig. 1 is an extended plan view of a blank from which a carton may be set up for use with the improved cake lift of the present invention.
Figure 5:
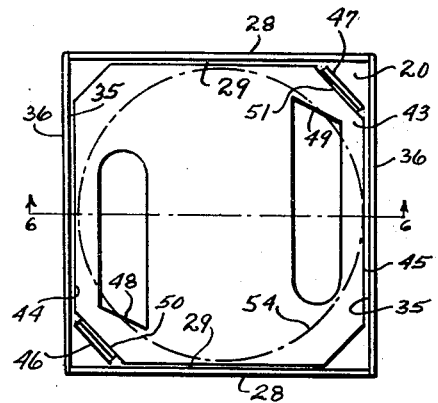
Fig. 5 is a top plan view of a set up carton from the blank of Fig. 1 having mounted therein the erected cake lift of Fig. 4.
Figure 6:
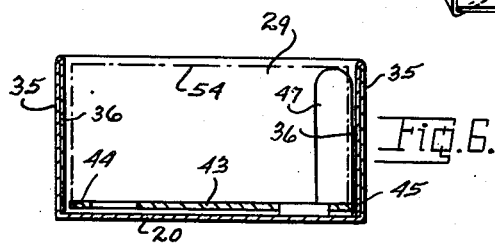
Fig. 6 is a transverse sectional view through Fig. 5 as seen from line 6—6 of said Fig. 5.

The erection of the blank of Fig. 1 into a box or carton is believed obvious but briefly is as follows:

The side wall extensions 26 are first raised to be normal to the bottom 20 on their score or fold lines 22 and 24 which correspondingly raises the bellows corners 41 on their score or fold lines 30 and 31. The side wall inner wall members are then folded, respectively on their score or fold lines 34, to be inwardly of the outer wall members 35. The end wall extensions 25 are then upwardly folded on their score or fold lines 21 and 23 and simultaneously each bellows corner 41 is folded on its diagonal score or fold line 42 and disposed inwardly of the carton side and end walls to be adjacent the inner surfaces of the end walls inner wall members 28. The end walls outer wall members 29 are then folded interiorly of the box or carton to enfold the said bellows corners and this folding of the said end walls 29 continues until the locking corners 32 and 33 thereof snap into the notches 39 and 40 of the side walls inner wall members for thereby locking the carton in its erected position and with its side and end walls in fully erected positions, as illustrated in Figs. 5 and 6.

As was noted above, the carton just described is merely an example of a four-sided carton with which the cake lift of the present invention may be employed, and it is understood that any other construction of a four-sided box or carton may be employed.

Figures 2, 3:
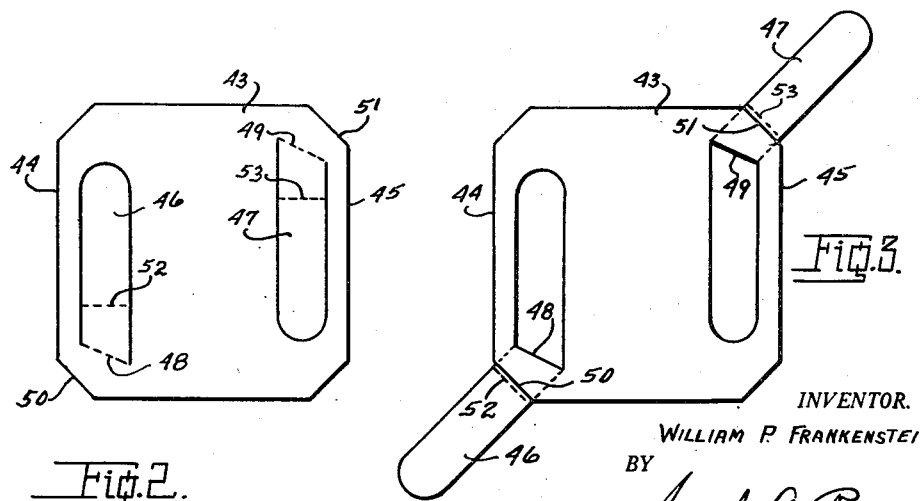
Fig. 2 is a plan view of one form of cake lift in its knocked-down condition as shipped to the user.
Fig. 3 is a plan view of the cake lift after the first step of setting up the cake lift from the blank of Fig. 2.
Figure 4:
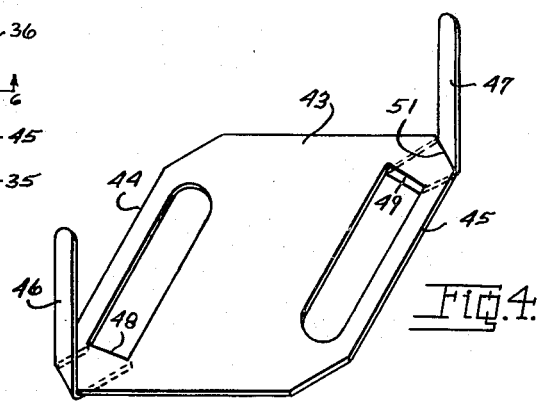
Fig. 4 is a perspective view of a completely erected cake lift from the blank of Fig. 2.

The cake lift of the present invention is illustrated in its simplest form in Figs. 2, 3 and 4 and comprises a flat, rectangular body member 43 which has an area substantially equal to the area of the bottom 20 of the box or carton with which it is to be used. Inwardly of two opposed edges of the cake lift body 43, such as, for example, edges 44 and 45, the said body portion is cut to provide arms 46 and 47 severed from said body portion on three sides thereof but respectively joined to the body portion through a score or fold line 48 and 49 disposed at an angle to the longitudinal axis or center of the arms 46 and 47. The corners of the cake lift body portion 43 nearest to the attached ends of the said arms 46 and 47 are biased, preferably at an angle of 45°, as indicated at 50 and 51. Each of the arms 46 and 47 is provided inwardly of its attached end with a transverse score or fold line 52 and 53.

The cake lift is shipped to the user in its cut and scored condition as just described above and as illustrated in Fig. 2.

The user, upon desiring to set up the cake lift, does so by bending the arms downwardly and outwardly on their score or fold lines 48 and 49 disposing the portions of said arms, respectively, between the score or fold lines 48—52 and 49—53 beneath the body portion between the score line 48 and biased corner 50 and score line 49 and biased corner 51. The parts of the cake lift are now in the positions of Fig. 3 and in order to fully erect the cake lift the arms 46 and 47 are respectively now upwardly bent on their transverse score or fold lines 52 and 53 whereupon they are in the position of Fig. 4.

The cake lift is now in condition to have disposed on its upper surface a baked cake prior to the frosting or decorating thereof. This step in the production of the cake may be effected while the lift arms are in their positions, as illustrated in Fig. 3. At the completion of the frosting and decorating operation, the cake and its lift, through the arms 46 and 47, may be lowered into position, as illustrated in Figs. 5 and 6 and in which figures the cake is illustrated in phantom lines 54.

It will be noted, particularly from Fig. 5, that the lift arms bear a relation to the cake and its enclosing box or carton whereby ample space is provided for the user's fingers in placing the cake within the box or carton without interference. The purchaser of the frosted or decorated cake is likewise provided with ample clearance for engaging said lift arms for removing the cake lift and cake from its box or carton.

From the foregoing it will be noted that while the lift arms are formed of card or paperboard material and are connected with the cake lift body portion through a score or fold line, the strain on said score or fold line is reduced to a minimum since the said strain will be in part taken by the portion of the lift arm underlying the body portion of the cake lift.

The modified cake lift illustrated in Figs. 7 to 14, inclusive, while embodying the principles of the cake lift of Figs. 1, 2 and 3, has the lift arms formed from material exteriorly of the cake lift body portion but subsequently folded to reinforce the attachment of the lift arms and body portion.

Specifically this modified cake lift comprises a body portion 43' having at least two opposed corners thereof biased and defined by score or fold lines 55 and 56 and through which lift arms 57 and 58 are respectively attached to the said body portion 43'. Each of said lift arms 57 and 58 is provided transversely with score or fold lines 59, 60 and 61 with said score or fold lines 59 and 61 parallel to one another and at right angles to the axis of its arm while the score or fold line 60 extends at an angle to the score or fold lines 59 and 61 and to the axis of its arm. The said arms score or fold lines are for the purpose of folding the said arms so that they upstand normal to the body portion 43' as will now be set forth.

Figure 10:
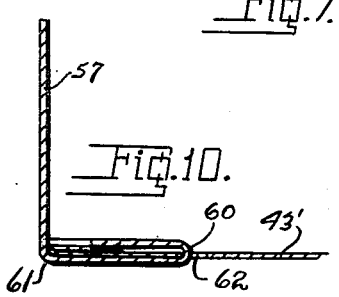
Fig. 10 is an enlarged fragmentary sectional view through the erected modified cake lift as seen from line 10—10 on Fig. 8.

In folding the arms to the position illustrated in Fig. 10, each of said arms is first folded onto the upper surface of the cake lift body portion, as seen in Fig. 7, by folding same respectively on the score or fold lines 55 and 56. In this position the said arms now lie outwardly of the body portion 43', as illustrated in phantom lines in the lower left-hand corner of Fig. 7. The said arms are now respectively folded on their score or fold line 59, which is now lying substantially coincident with an edge of the cake lift body portion 43', so that said arms occupy the phantom line illustration of arm 58 in the upper right-hand corner of Fig. 7. In this position the said arms 57 and 58, respectively overlie an elongated aperture 62 and 63 formed through the body portion 43' respectively inwardly of biased corners 55 and 56. In this position of the arms 57 and 58 the angular fold line 60 of each arm overlies its body aperture 62 and 63. In the further erecting of the modified cake lift, the said arms 57 and 58 are respectively folded on their angular score or fold line 60 and the said arms respectively passed through its elongated aperture 62 and 63 to project below the body portion 43' whereupon said arms are folded, still on its score line or fold line 60, to lie outwardly of its respective biased corner 55 and 56, as illustrated in the upper right-hand corner of Fig. 8.

Figure 8:
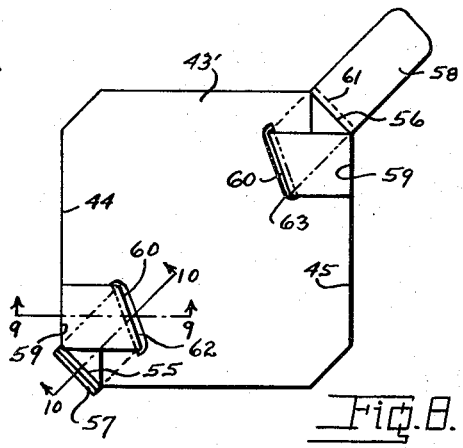
Fig. 8 is a plan view of the cake lift of Fig. 7 illustrating two further steps in the setting up of the modified cake lift.

The cake lift may at this time have a baked cake placed thereon for frosting or decorating whereupon the lift arms 57 and 58 are upwardly folded on their respective fold lines 61 to upstand, as illustrated in the lower left-hand corner of Fig. 8 and as illustrated in cross section in Fig. 10.

It will be noted by this construction the lift arms are again provided with portions that co-operate with the cake lift body portion in resisting strain on the connection of the parts to one another. At the same time the cake itself overlies a portion of the reinforcement of the lift arms and thereby more surely binds the parts on one another in the operation thereof.

The folding or erecting of the lift arms from the blank of Fig. 7 may be substantially reversed, as illustrated in Figs. 11 to 14, for thereby bringing the portion of each lift arm 57 and 58 immediately adjacent the lifting portion of the arm beneath the cake. These erecting steps are clearly illustrated in Figs. 11 and 12 and wherein the first fold is effected on the score or fold line 59 followed by a fold of said arms respectively on the body portion corner bias score or fold line 55 and 56. These folds bring the said arms to the same positions as above set forth except that the said arms are now below or against the undersurface of the body portion 43' instead of above the same. The next fold is on the angular socre 60 for disposing said arms upwardly of the body portion through their respective elongated apertures 62 and 63 whereupon the said arms are outwardly folded, still on the angular score or fold lines 60, for thereby bringing the portions of said arms between the score or fold lines 60 and 61 onto the upper surface of the cake lift body portion, as illustrated in Figs. 12 and 13. The complete erection of the cake lift is then effected by merely raising the arms on their score or fold lines 61.

The foregoing modifications were particularly concerned with placing the lift arms at opposed corners of the body portion of the cake lift and would primarily be employed with round cakes. The modification illustrated in Figs. 15 to 18 disposes the lift arms at the opposite sides of the cake lift and substantially centrally thereof.

Specifically use is again made of a body portion 43" having connected to two opposed sides thereof through score or fold lines 64 and 65 an arm 66 and 67. Each of the lift arms 66 and 67 is provided with a score or fold line 68 at right angles to its axis as well as a diagonal score or fold line 69.

The body portion 43" is provided inwardly of its sides with tongues 70 and 71, respectively hingedly connected with the body portion through a score or fold line 72 and 73. The tongues 70 and 71 are for the purpose of locking the arms in their operative position and, it is believed obvious, that such locking tongues could be provided in the modification illustrated in Figs. 7 to 14, inclusive.

In erecting the cake lift from the blank of Fig. 15 the locking lugs or fingers 70 and 71 are first depressed, as seen in Fig. 15, whereupon the said lift arms are respectively folded on score or fold lines 64 and 65 to underlie the body portion 43", as illustrated in phantom lines in the right-hand side of Fig. 15. The locking fingers 70 and 71 are then actuated about their respective score or fold lines 72 and 73 to engage and hold the portion of its finger which is encompassed, in arm 66, between the score or fold lines 64 and 69 and the end of the said arm, and in arm 67, the portion encompassed by score or fold lines 65 and 69 and the end of said arm. The said arms are then each actuated on its diagonal score or fold line 69 to lie outwardly of the body portion 43", as illustrated in the left-hand side of Fig. 16, whereupon each of said arms is raised or folded on its score or fold line 68 to upstand from the body portion 43", as illustrated by the right-hand side of Fig. 16 and in Figs. 17 and 18.

It will be noted that in this modification the lift arms are reinforced at their connection with the cake lift body portion and further, that the said lift arms are locked in their folded operative positions. It will also be understood that the objects initially set forth have been fully accomplished.

What is claimed is:

1. A blank for forming a cake lift comprising a central portion for forming in the cake lift a body portion substantially rectangular in plan having an axis extending in a given direction, said blank including portions to form in the cake lift a lift arm adjacent each of two opposed sides of said body portion with each lift arm having its axis extending parallel with the body portion axis, each lift arm portion including a portion adapted to upstand with respect to said body portion, and each lift arm portion including means integrally hingedly connecting said upstanding portion of each lift arm with the body portion and adapted to be disposed in superimposed relation to the said body portion upon erection of the cake lift.

2. A blank for forming a cake lift comprising a central portion to form in the cake lift a body portion substantially rectangular in plan, said blank including portions to form lift arms including an upstanding portion and cut from the blank central portion inwardly thereof opposite edges thereof, and said lift arms including portions integrally hingedly connecting the upstanding portions to the blank central portion with said connecting portions in superimposed relation to the blank central portion upon and at right angles to the lift body portion erection of the cake lift.

3. A blank for forming a cake lift comprising a central portion to form in the cake lift a body portion substantially rectangular in plan, said blank central portion having two opposed corners biased or angularly cut, said blank including portions to form a lift arm adjacent each of two opposed sides of the blank central portion and each lift arm portion including a portion to upstand with respect to the body portion, and each lift arm portion including a portion hingedly connected therewith and hingedly connected with the body portion for disposition in superimposed relation with the body portion adjacent the biased or angularly cut corners thereof and disposing its lift arm upstanding portion adjacent to and parallel with a biased or angularly cut corner.

4. A blank for forming a cake lift comprising a central portion to form in the cake lift a body portion substantially rectangular in plan, said blank including portions to form a lift arm adjacent to but exteriorly of each of two opposed sides, said lift arm portions each having an opposite end integrally hingedly connected with the blank central portion through a diagonal score or fold line which in the erected cake lift constitutes opposed biased corners for the cake lift body portion, each of said lift arm portions including a portion adapted in the erected cake lift to upstand relative to the body portion, and said lift arm portions including between the attached ends and upstanding portions additional, hingedly, connected portions adapted in the erected cake lift to be in superimposed relation with said body portion adjacent the connections of the lift arms with said body portion.

5. A blank for forming a cake lift comprising a central portion to form in the cake lift a body portion substantially rectangular in plan, portions of said blank adjacent each of two opposed sides of the body portion forming in the cake lift, when erected, lift arms, said lift arm portions of the blank each including a portion for hingedly connecting the lift arm portions to the central portion, said central portion having an elongated aperture formed therethrough inwardly of the points of attachment of the lift arm portions, and each lift arm portion including between its upstanding portion and connecting portion additional portions for superimposed relation on the body portion between the connection of the lift arm portions and the body portion apertures.

6. A blank for a cake lift comprising a central or body portion, lift arm portions flanking and outwardly of two opposed sides of the body portion, said lift arm portions being hingedly connected with the body portion along a biased hinge line at opposite corners of said body portion, each lift arm portion including a portion connected with the body portion through said biased hinge line for, in the erected cake lift, superimposed relation to said body portion adjacent the corner thereof, each of said lift arms adjacent the connecting portion thereof including additional portions for superimposed relation on one another and the body portion, said last mentioned portions being separated from one another by a diagonal score line, said central or body portion of the blank having formed therethrough elongated apertures angularly disposed to the axis of the body portion to permit, upon erection of the cake lift, the lift arms to be inserted therethrough for the superimposing of the lift arm portions on one another and on the body portion, and each lift arm portion including a portion to upstand from the body portion.

7. A cake lift formed from a single blank having a body portion substantially rectangular in plan and having an axis extending in a given direction, a pair of lift arms each formed from said blank with its axis extending parallel with the aforesaid axis of the body portion and each lift arm including a portion adapted to upstand relative to said body portion and a connecting portion integrally, hingedly, connected with each lift arm upstanding portion and integrally, hingedly, connected with said body portion at two opposite points thereof, each of said connecting portions having one of its hinge connections biased or extending in an angular direction with respect to its axis so that said connecting portion is disposed in superimposed relation on and beneath the body portion and disposes the upstanding portion of each lift arm with its axis at right angles to the plane of the aforementioned body portion axis.

8. A cake lift formed from a single blank having a body portion substantially rectangular in plan and having an axis extending in a given direction, a pair of lift arms each formed from said blank with its axis extending parallel with the aforesaid axis of the body portion and each lift arm including a portion adapted to upstand relative to said body portion and a connecting portion integrally, hingedly, connected with each lift arm upstanding portion and integrally, hingedly, connected with said body portion at two opposite corners thereof, each of said connecting portions having one of its hinge connections biased or extending in an angular direction with respect to its axis so that said connecting portion is disposed in superimposed relation on and beneath the body portion and disposes the upstanding portion of each lift arm with its axis at right angles to the plane of the aforementioned body portion axis.

9. A cake lift formed from a single blank having a body portion substantially rectangular in plan and having an axis extending in a given direction, a pair of lift arms each formed from said blank with its axis extending parallel with the aforesaid axis of the body portion and each lift arm including a portion adapted to upstand relative to said body portion and a connecting portion integrally, hingedly, connected with each lift arm upstanding portion and integrally, hingedly, connected with said body portion at two opposite sides thereof, each of said connecting portions having one of its hinge connections biased or extending in an angular direction with respect to its axis so that said connecting portion is disposed in superimposed relation on and beneath the body portion and disposes the upstanding portion of each lift arm with its axis at right angles to the plane of the aforementioned body portion axis.

References Cited in the file of this patent

UNITED STATES PATENTS

| | | |
|---|---|---|
| 692,618 | Carr | Feb. 4, 1902 |
| 1,596,521 | Farnham | Aug. 17, 1926 |
| 1,927,435 | Derst | Sept. 19, 1933 |
| 2,051,512 | Bergquist | Aug. 18, 1936 |
| 2,205,813 | Cudemo | June 25, 1940 |
| 2,389,703 | Van Rosen | Nov. 27, 1945 |

FOREIGN PATENTS

| | | |
|---|---|---|
| 69,167 | Norway | Apr. 16, 1945 |